United States Patent [19]

Coggins

[11] Patent Number: 5,520,945
[45] Date of Patent: May 28, 1996

[54] METHOD OF ROLLING DOUGH USING A DISPOSABLE SHEET

[76] Inventor: Jean Coggins, 10 Ray St., Greenville, S.C. 29611

[21] Appl. No.: 329,544

[22] Filed: Oct. 26, 1994

[51] Int. Cl.⁶ ........................................................ A21D 8/02
[52] U.S. Cl. ........................ 426/496; 426/124; 426/128; 426/502; 425/470; 425/472; 249/113
[58] Field of Search ................................. 426/496, 502, 426/124, 128; 425/470, 472; 249/113

[56] References Cited

U.S. PATENT DOCUMENTS 1,814,485  7/1931  Moss ........................ 426/496

4,787,597  11/1988  Yokota et al. ................. 249/113

Primary Examiner—Helen Pratt
Attorney, Agent, or Firm—Hardaway Law Firm

[57] ABSTRACT

A disposable sheet is provided that may be used in food service applications to prevent the cross-contamination of foods and eliminate the need for time consuming clean-ups. The sheet comprises a porous layer for allowing materials such as oil or flour to pass through, an absorbent layer for holding the materials passing through the porous layer, and a barrier layer for making sure that the materials do not contaminate a food preparation surface. The sheet has multiple uses such as for rolling dough, absorbing excess moisture, making sandwiches, cutting breads and condiments, and drawing excess oil away from fried items.

5 Claims, 1 Drawing Sheet

METHOD OF ROLLING DOUGH USING A DISPOSABLE SHEET

BACKGROUND OF THE INVENTION

In the field of food preparation, cleanliness and the prevention of cross-contamination of food products is a primary concern. For example, when baking, dough is usually rolled out on top of a food preparation surface. If, however, that food preparation surface has not been thoroughly cleaned of whatever food product was previously on the food preparation surface, e.g., raw chicken or the like, there is a great probability that the dough will become contaminated with deadly germs, such as certain strains of E-coli or salmonella bacteria. Accordingly, when changing from one food product to another, extensive time may be required in cleaning and sanitizing food preparation surfaces.

Furthermore, in the art of baking it is known that prior to rolling out dough, the food preparation surface will usually be coated with a layer of flour to prevent the dough from sticking to the food preparation surface and/or the rolling pin. Often, excess flour is incorporated into the dough. After the dough is rolled, remaining flour needs to be cleaned up so that other food preparation may be done at the work station. To date, this excess flour has been merely wiped up, in an inefficient manner, with a sponge or rag. While in some cases, a piece of wax paper is placed on the food preparation surface, and the flour placed thereon, because the flour is not absorbed into the wax paper, excess flour may be worked into the dough and unused flour still needs to be cleaned up.

Thus, there is room for improvement within the art.

SUMMARY OF THE INVENTION

It is an object of the invention to provide an efficient and sanitary way of preparing a surface for the placement of food products thereon.

It is a further object of the invention to provide for a disposable device that both keeps a food preparation surface clean and prevents the cross contamination of food products.

It is still a further and more particular object of this invention to provide a disposable sheet which facilitates the rolling out of dough and similar pastries by limiting the amount of free flour which comes in contact with the dough.

Still a further more particular object to this invention to provide a mesh of a non-woven material, such as rayon, polyester, or polypropylene, which can be placed between a rolling surface and the dough or pastry and which limits the amount of free flour that comes in contact with the dough.

These and other objects of the invention are a food preparation surface cover, comprising:

a top layer, the top layer being made from a non-woven porous sheet material;

a middle layer, the middle layer being made from at least one layer of an absorbent material; and a third layer, the third layer made of a barrier material and secured to the top layer, thereby securing the middle layer between the barrier layer and the top layer.

BRIEF DESCRIPTION OF THE DRAWINGS

FIG. One is cross-sectional elevational view of a disposable dough sheet according to the invention.

FIG. Two is a plan view of a disposable dough sheet according to the invention.

DETAILED DESCRIPTION

In accordance with the invention it has been found that an easy and inexpensive to manufacture disposable dough sheet can be produced that both keeps a food preparation surface clean while preventing the cross-contamination of food products.

Figure 1:
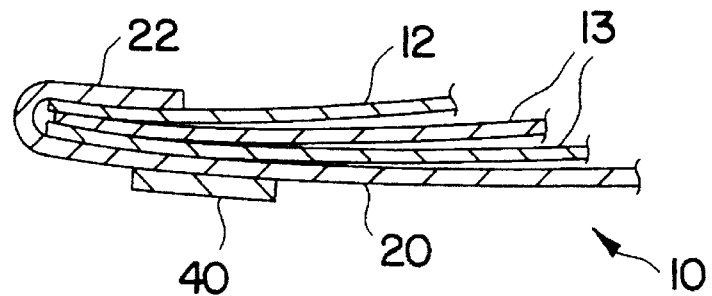
Figure 2A:
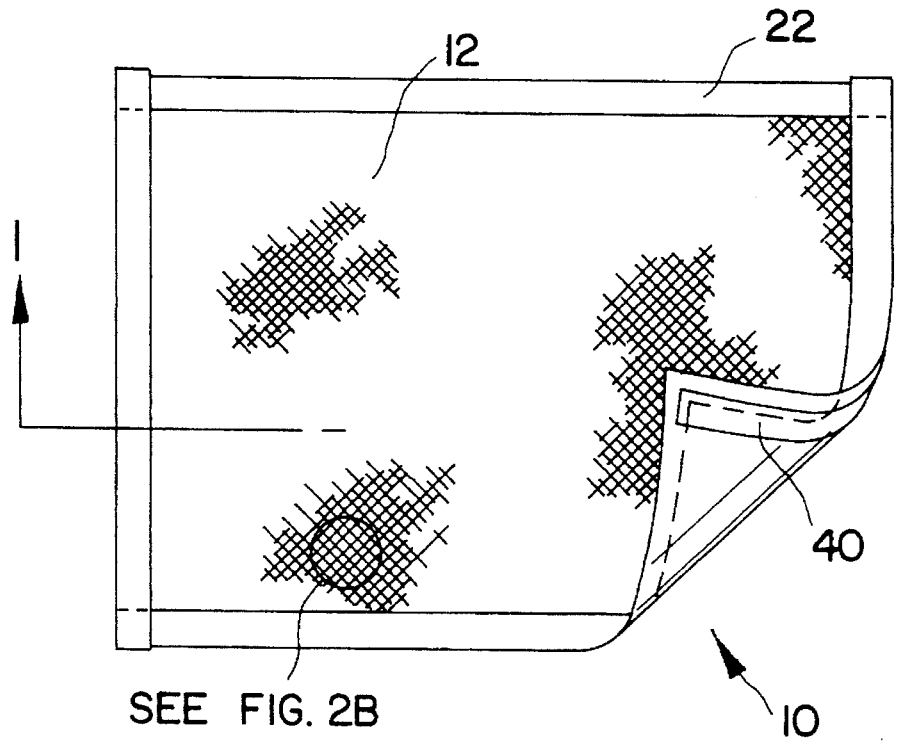
Figure 2B:
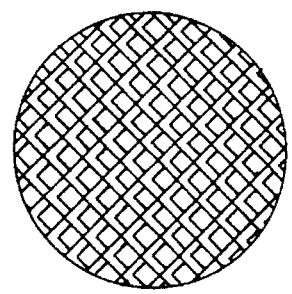

FIG. 1 shows a preferred embodiment of disposable dough sheet 10 according to the invention. Dough sheet 10 comprises four parts. First, there is a flexible bottom barrier layer or sheet 20 having folded-over edges 22 (FIG. 2). This backing sheet is constructed out of polyethylene or other similar plastic material, a coated sheet, or closed-cell foam all of which provides a barrier against liquid and organic food substances. Whatever material is used, however, must have the capability of being an effective protective barrier against the passage of food products, germs, etc. Furthermore, it is also possible to place an adhesive strip 30 with a peel off backing on the bottom of sheet 20 to allow dough sheet 10 to be secured to the work surface and, accordingly, not move while being used.

Top layer 12 can be provided from a variety of non-absorbent fabrics having a mesh of sufficient size to permit flour to pass through the fabric. Preferably, top layer 12 is made of a nonwoven fabric. Typical non-woven fabrics, such as those used for dryer sheets, have a random pattern of fibers which results in a porous fabric. One such non-woven material is constructed out of polyester and is available from Remay, Inc., Old Hickory, Tenn. and can be provided with a food quality silicon release agent to reduce any food adhesion problems which may occur. However, other non-woven materials such as rayon, polypropylene, and other nonwoven fabrics which do not stick to pastry can be used, with or without a release agent.

While non-woven materials are preferred for top layer 12, woven fabrics having an open or porous mesh can be used. However, such materials are not favored for a disposable product given their higher expense.

Middle layer 13 is provided by an absorbent material such as a cellulose-type tissue paper. Absorbent qualities similar to that provided by a single sheet of a commercial paper towel has proven highly effective. For commercial applications, where a large volume or number of pastry-type items may be processed in a row, middle layer 13 can comprise a sheet of blotter paper which is capable of absorbing more moisture, thereby extending the life of the dough sheet. While middle layer 13 is envisioned as being a single layer, multiple layers or multi-ply materials can be used to provide an equivalent to single layer 13.

Additional absorbent materials could be used in place of paper or cellulose products. For instance, middle layer 13, can be provided by an absorbent gel forming substance, such as that used in disposable diapers. An absorbent chemical, such as corn-starch, or other similar ingredient could be used alone or in conjunction with a supporting matrix to absorb excess moisture. However, such alternative embodiments are disfavored since they are not economically as practical and raise concerns over exposing food products to a potentially harmful substrate.

As shown in the preferred embodiment seen in FIG. 1, top layer 12 and middle layer(s) 13 are encased and sandwiched between bottom layer 20 and its folded-over edges 22 that are glued to top layer 12. However, overlapping edges are envisioned as nonillustrated embodiments. It is conceived that disposable dough sheet 10 will be stored in a rolled-up configuration, for example, in a sanitary bag. More rigid embodiments, such as those provided by a closed-cell foam barrier can be packaged in stacks. The dough sheet can be provided in a sterile package, the contents being sterilized by irradiation or chemical treatment similar to treatments used for the sterilization of medical gauze and bandages. Furthermore, disposable dough sheet 10 may have any dimensions needed to entirely cover a given food preparation surface. Finally, any of the various layers described above may be made from recycled materials.

While the preferred embodiment provided for the barrier layer to have folded over edges which encompass the middle layer therebetween, other means of assembling and securing the respective layers are possible. The barrier layer and top fabric layer can be secured by adhesives or heat sealing methods which partially melts and thereby joins the two materials together. The intervening middle layer, being slightly smaller in size, would be held in place between the two joined layers.

Disposable dough sheet 10 is used as follows. Dough sheet 10 will be unbagged, unrolled or unfolded, and placed on a food preparation surface, such as a counter-top. If bottom layer 20 has an adhesive backing 30, it is exposed for securing to the counter-top. In the case of baking applications, flour would be sprinkled onto top layer 12, as it would normally be sprinkled onto the food preparation surface. This flour will pass through top layer 12 and come to rest on middle layer(s) 13. Then, as the dough is placed onto dough sheet 10 for rolling, and actually is rolled, the downward force of the rolling pin will compress dough sheet 10, placing the flour caught in middle layer(s) 13 in communication with the bottom of the rolled dough to prevent its sticking to top layer 12. The materials described above, out of which layers 12 are 13 are to be formed, will hold up well under the stress of rolling and cutting dough. Furthermore, because of bottom barrier layer 20, any materials or germs on the food preparation surface will not be able to come into contact with the dough, nor vice versa. After the dough is rolled out and moved off dough sheet 10, and onto, for example, a baking sheet, dough sheet 10 is merely picked up with the excess flour caught in the middle layer(s) 13, rolled up, and thrown away. This assures sanitation, eliminates cross-contamination, and virtually eliminates clean-up of the food preparation surface for business and kitchen uses.

It is possible to improve the results of conventional dough and pastry processing by merely providing a fabric mesh as described above between the rolling surface and the dough. The mesh will prevent excess flour from adhering to the pastry and increase the efficiency the dough preparation process. However, it is much preferred to incorporate the mesh with a barrier layer and/or a moisture absorbing layer in combination with the mesh.

Disposable dough sheet 10 can also be used for other food preparation purposes. For example, sheet 10 can be rolled out, as described above, and then freshly baked item may be placed thereon to cool. Sheet 10, through layers 12 and 13 will then absorb any excess moisture in the baked good without passing it to the food preparation surface or to a dish that would have to be cleaned. As yet another application for sheet 10, freshly fried items, such as french-fries or donuts, can be placed on sheet 10. Sheet 10, through layers 12 and 13 will then absorb any excess oil from the fried food without passing the oil to the food preparation surface or to a dish that would have to be cleaned as is the case when a normal paper towel is used for the above application. For hot grease and oil applications, barrier layer 20 and top layer 12 can be provided by heat-resistant materials which maintains integrity of the sheet and safeguards the food. Furthermore, because sheet 10 may be grasped by edges 22, no oil within sheet 10 will get on the hands of the person preparing the food. Finally, sheet 10 can used to make sandwiches, slice bread and sandwich condiments, and also be laid on a food preparation surface to collect drips while mixing cake ingredients or decorating a cake.

The adhesive backing 30 can be provided by a pattern adhesive which provides a reusable, non-water soluble tacky coating which can hold sheet 10 in place and permits sheet 10 to be repositioned. One such adhesive is available from Craft-Tac., Inc. of Mendora, Minn. Adhesive tape with a peel strips such as those provided by disposable diapers can also be provided as the adhesive 30 means.

The above examples show that disposable dough sheet 10 can be used like a place mat in any food preparation application. Its benefit over conventional place mat materials, such as paper towels, wax paper, or cloth, is that it absorbs excess moisture or food product, yet does not allow for bleed through or dripping of excess materials off of the mat and onto either a food preparation surface or the hands of the person preparing the food.

Furthermore, its benefit over cake decorating dishes or cooling plates, etc., is that because dough sheet 10 is disposable, there is no clean up.

Disposable dough sheets 10 can be used by, and distributed to, all kinds of restaurants, bakeries, delis, fast food restaurants, and institutional kitchens. It is conceived that sheet 10 can be custom made for a particular business, such as by matching the colors of the various layers or edges 22 to those of the business or by emblazoning edges 22 with the emblems or logos of the business. Further, the dough sheet can be enclosed in a pre-packaged ingredient kit for making dough or pastry for retail markets. The dough sheet can also come prepared with recipes or directions printed on the margins of the sheet.

The above description is given in reference to a disposable dough sheet. However, it is understood that many variations are apparent to one of ordinary skill in the art from a reading of the above specification and such variations are within the spirit and scope of the instant invention as defined by the following appended claims.

That which is claimed:

1. A method of protecting dough from contamination while handling, comprising the steps of:

providing a sheet material having an upper non-woven porous layer, an absorbent cellulose layer, and a plastic barrier layer;

placing said sheet on a surface with said barrier layer in contact with said surface;

placing said dough on said porous layer;

sprinkling flour on said porous layer before placing thereon, whereby a majority of said flour passes through said porous layer;

rolling said dough on said porous layer said porous layer preventing excess flour from adhering to said dough; whereby;

when said sheet is discarded there is no excess flour nor dough on said surface.

2. The method according to claim 1 wherein;

said food product is a freshly fried item;

during said processing, excess oil on said food product is absorbed by the absorbent layer; and when said sheet is discarded there is no oil on said surface and said oil is maintained within said sheet.

3. Method according to claim 1, wherein said step of providing a sheet material having a porous layer, an absorbent layer, and a barrier layer, further comprises;

encasing said porous and absorbent layers between said barrier layer and its edges.

4. A method of protecting food products from contamination while handling, comprising the steps of:

providing a sheet material having a non-woven porous layer, an absorbent cellulose layer, and a plastic barrier layer;

placing said sheet on a surface with said barrier layer in contact with said surface;

placing said food product on said porous layer;

processing said food product while on said porous layer;

removing said food product from said sheet; and discarding said sheet.

5. A method of rolling dough comprising:

providing a rolling surface;

providing a sheet material having a lower plastic barrier layer and an upper non-woven mesh layer;

placing said sheet material on said rolling surface;

said barrier layer in contact with said rolling surface;

spreading flour on said mesh layer, a majority of said flour passing through said mesh layer;

placing dough on said mesh;

rolling out said dough on said mesh, said mesh limiting contact between said flour and said rolled dough; whereby when said sheet is discarded there is no excess flour nor dough on said rolling surface.

* * * * *